(12) United States Patent
Flaxman

(10) Patent No.: US 10,836,427 B2
(45) Date of Patent: Nov. 17, 2020

(54) DRIVE CONFIGURATIONS FOR SKID STEERED VEHICLES

(71) Applicant: QINETIQ LIMITED, Hampshire (GB)

(72) Inventor: Robert John Bonner Flaxman, Guildford (GB)

(73) Assignee: QINETIQ LIMITED, Hampshire (GB)

(*) Notice: Subject to any disclaimer, the term of this patent is extended or adjusted under 35 U.S.C. 154(b) by 196 days.

(21) Appl. No.: 16/303,127

(22) PCT Filed: Mar. 16, 2017

(86) PCT No.: PCT/EP2017/056310
§ 371 (c)(1),
(2) Date: Nov. 19, 2018

(87) PCT Pub. No.: WO2017/198356
PCT Pub. Date: Nov. 23, 2017

(65) Prior Publication Data
US 2020/0331526 A1  Oct. 22, 2020

(30) Foreign Application Priority Data

May 18, 2016  (GB) .................................. 1608745.4

(51) Int. Cl.
*B60K 6/48* (2007.10)
*B62D 11/18* (2006.01)
(Continued)

(52) U.S. Cl.
CPC ............ *B62D 11/183* (2013.01); *B60K 17/16* (2013.01); *B60K 23/04* (2013.01); *B62D 11/16* (2013.01);
(Continued)

(58) Field of Classification Search
CPC ...... B62D 11/183; B62D 11/16; B60K 23/04; B60K 17/16; B60K 2006/4816; B60K 2023/043; F16H 48/36
See application file for complete search history.

(56) References Cited

U.S. PATENT DOCUMENTS 5,195,600 A * 3/1993 Dorgan ................ B60K 17/046
180/305
7,757,797 B2 * 7/2010 Dobereiner ............ B62D 55/06
180/65.31
(Continued)

FOREIGN PATENT DOCUMENTS

CN    102673643 A    9/2012
DE    102010051058 A1    5/2012
(Continued)

OTHER PUBLICATIONS

International Search Report and Written Opinion for PCT Patent App. No. PCT/EP2017/056310 (dated Sep. 5, 2017).
(Continued)

*Primary Examiner* — David J Hlavka
(74) *Attorney, Agent, or Firm* — Kenealy Vaidya LLP

(57) ABSTRACT

Some embodiments are directed to a drive configuration for a skid steered vehicle includes first and second torque outputs coupled by a differential and in a torque connection with first and second electric motors, the differential being configured to mechanically transfer power across itself; and a mechanical power splitter having a first torque transfer feature in a torque connection with a combustion engine, a second torque transfer feature in a torque connection with a respective additional electric motor and a third torque transfer feature in a torque connection with at least one of the first and second torque outputs of the drive configuration, wherein torque output from the or each the mechanical
(Continued)

power splitter in use is dependent on torques generated by the combustion engine and the associated additional electric motor.

20 Claims, 9 Drawing Sheets

(51) Int. Cl.
    *B60K 17/16*     (2006.01)
    *B60K 23/04*     (2006.01)
    *B62D 11/16*     (2006.01)
    *F16H 48/36*     (2012.01)

(52) U.S. Cl.
    CPC ...... *F16H 48/36* (2013.01); *B60K 2006/4816* (2013.01); *B60K 2023/043* (2013.01)

(56) References Cited

U.S. PATENT DOCUMENTS

| | | | | |
|---|---|---|---|---|
| 8,029,399 | B2* | 10/2011 | Thompson | B62D 11/14 |
| | | | | 475/150 |
| 8,303,446 | B2* | 11/2012 | Thompson | F16H 35/008 |
| | | | | 475/5 |
| 2004/0050597 | A1 | 3/2004 | Al et al. | |
| 2004/0200648 | A1* | 10/2004 | Tarasinski | B60L 15/20 |
| | | | | 180/65.7 |
| 2007/0102209 | A1* | 5/2007 | Doebereiner | B60L 7/10 |
| | | | | 180/65.23 |
| 2011/0048814 | A1* | 3/2011 | Thompson | F16D 1/10 |
| | | | | 180/6.7 |
| 2011/0053726 | A1* | 3/2011 | Thompson | F16H 1/2827 |
| | | | | 475/207 |
| 2014/0011625 | A1* | 1/2014 | Thompson | B60K 17/043 |
| | | | | 475/225 |

FOREIGN PATENT DOCUMENTS

| | | |
|---|---|---|
| JP | 11-240347 A | 9/1999 |
| WO | WO2008/048477 A2 | 4/2008 |
| WO | 2014/206597 A1 | 12/2014 |
| WO | WO2015/173638 A1 | 11/2015 |

OTHER PUBLICATIONS

Search Report for Great Britain Patent App. No. 1621968.5 (dated Jul. 3, 2017).

* cited by examiner

DRIVE CONFIGURATIONS FOR SKID STEERED VEHICLES

GOVERNMENT LICENSE RIGHTS

This invention was made with Government support under Contract No. W56HZV-11-C-C001 awarded by the United States Army. The Government has certain rights in this invention.

CROSS REFERENCE TO RELATED APPLICATION(S)

This application is a national phase filing under 35 C.F.R. § 371 of and claims priority to PCT Patent Application No. PCT/EP2017/056310, filed on Mar. 16, 2017, which claims the priority benefit under 35 U.S.C. § 119 of British Patent Application No. 1608745.4, filed on May 18, 2016 and British Patent Application No. 1621968.5, filed on Dec. 22, 2016, the contents of each of which are hereby incorporated in their entireties by reference.

BACKGROUND

Some embodiments relate to drive configurations for propelling and enabling skid steering of skid steered vehicles.

Tracked vehicles are skid steered by forcing opposing parallel tracks to run at different speeds. To turn left for instance, the left side track is caused to run at a slower speed that the right side track. WO2014/206597A1 describes multiple drive configurations for propelling tracked vehicles and enabling skid steering. Some embodiments concern other drive configurations for skid steered vehicles with associated advantages.

SUMMARY

Some embodiments are directed to a drive configuration for a skid steered vehicle, including:
  first and second torque outputs that are coupled by a differential and in a torque connection with first and second electric motors respectively, the differential being configured to mechanically transfer power across itself; and
  at least one mechanical power splitter having a first torque transfer feature in a torque connection with a combustion engine, a second torque transfer feature in a torque connection with a respective additional electric motor and a third torque transfer feature in a torque connection with at least one of the first and second torque outputs of the drive configuration, either directly or indirectly via the differential;
  wherein torque output from the or each the mechanical power splitter in use is dependent on torques generated by the combustion engine and the associated additional electric motor; and
  wherein a controller is configured selectively to control the respective speeds and torques of the first, second and third torque transfer features of the mechanical power splitter.

Thus, the controller may be configured to selectively control the mechanical power splitter speeds and torques of the first torque transfer feature in connection with the combustion engine and the second torque transfer feature in connection with the respective additional electric motor and hence, control the speed and torque of the third torque transfer in connection to at least one of the first and second torque outputs of the drive configuration.

A novel differential (forming a further aspect of some embodiments) that is configured to mechanically transfer power across itself and that is preferred for use in the above drive configuration is described further below.

In an alternative aspect of the presently disclosed subject matter, there is provided a drive configuration for a skid steered vehicle, including: first and second torque outputs that are coupled by a differential and in a torque connection with first and second electric motors respectively, the differential being configured to mechanically transfer power across itself; at least one mechanical power splitter having a first torque transfer feature in a torque connection with a combustion engine, a second torque transfer feature in a torque connection with a respective additional electric motor and a third torque transfer feature in a torque connection with at least one of the first and second torque outputs of the drive configuration, wherein torque output from the or each the mechanical power splitter in use is dependent on torques generated by the combustion engine and the associated additional electric motor; and a controller configured to determine vehicle control information from user input and based on this control performance of the electric motors and the combustion engine to drive rotation of the first and second torque outputs for causing user requested vehicle motion in a manner which optimizes or enhances an operational parameter of the vehicle.

The differential may be arranged to transfer torque between the third torque transfer feature of a the mechanical power splitter and both the first and second torque outputs of the drive configuration, the differential having: a first sub-arrangement in a torque connection with the first torque output of the drive configuration; a second sub-arrangement in a torque connection with the second torque output of the drive configuration; and a link for receiving torque from the third torque transfer feature of the mechanical power splitter which is common to both the first and second sub-arrangements.

The third torque transfer feature of one the mechanical power splitter may be in a torque connection with the first torque output of the drive configuration on one side of the differential and the third torque transfer feature of another the mechanical power splitter may be in a torque connection with the second torque output of the drive configuration on the other side of the differential.

The drive configuration may further include at least one further electric motor in a torque connection with the differential for imparting a torque differential between torque outputs of the differential.

The controller may be configured to maintain operation of the combustion engine at a particular rotational speed and control performance of the electric motors in order to cause user requested vehicle motion, wherein the particular rotational speed may optimize or enhance an operational parameter of the combustion engine and the operational parameter may be any of fuel efficiency, engine power output or engine torque output.

The controller may be configured to detect the occurrence of at least one pre-specified scenario based on at least the user input and, in response, to control performance of each of the electric motors and the combustion engine in a pre-specified manner; wherein information received by the controller from at least one sensor may additionally be used to detect the occurrence of the at least one scenario.

The, or each (if more than one is present) the mechanical power splitter may be a planetary gearset, the first torque transfer feature of which is a sun gear, a ring gear or a carrier gear; the second torque transfer feature of which is another of the sun gear, ring gear and carrier gear; and the third torque transfer feature of which is the remaining of the sun gear, ring gear and carrier gear.

The drive configuration may further include a plurality of gear change units for selectively changing torque output from the first and second torque outputs of the drive configuration in use, wherein the controller may be configured to select an appropriate gear ratio based on at least the determined vehicle control information.

The drive configuration may further include at least one additional combustion engine, the engines being arranged in parallel for driving a shaft.

According to a further alternative aspect of the presently disclosed subject matter there is provided a drive configuration for a skid steered vehicle, including: first and second torque outputs that are coupled by a differential and in a torque connection with first and second electric motors respectively, the differential being configured to mechanically transfer power across itself; at least one mechanical power splitter having a first torque transfer feature in a torque connection with a combustion engine, a second torque transfer feature in a torque connection with a respective additional electric motor and a third torque transfer feature in a torque connection with at least one of the first and second torque outputs of the drive configuration, wherein torque output from the or each the mechanical power splitter in use is dependent on torques generated by the combustion engine and the associated additional electric motor; and a controller configured to determine remaining vehicle battery power from information received from a battery unit and when this is below a threshold amount to control performance of the combustion engine and the electric motors to cause the battery to charge up while causing user requested vehicle motion in accordance with received user input.

A novel differential that transfers power across itself and that may be used in the above drive configurations is now described.

Another embodiment may be directed to a novel drive configuration for a skid steered vehicle, including:
first and second torque outputs that are coupled by a differential and in a torque connection with first and second electric motors respectively,
wherein the differential is configured to mechanically transfer power across itself and includes:
a pair of outer planetary gear sets and a pair of inner planetary gear sets, both pairs disposed between the first and second electric motors, the pair of inner planetary gear sets being disposed between (i.e. nested within) the pair of outer planetary gear sets;
the pair of outer planetary gear sets including:
a pair of outer planet carriers arranged to turn with the respective output shafts;
a pair of outer sun gears arranged to turn with the respective rotors of the propulsion motors; and,
a pair of outer ring gears, operatively coupled to each other via a gear arrangement that only allows the outer ring gears to rotate relative to one another in an equal and opposite manner;
the pair of inner planetary gear sets including:
a pair of inner planet carriers interconnected by a cross-shaft such that the carriers rotate in common;
a pair of inner ring gears arranged to turn with the respective output shafts; and,
a pair of inner sun gears, wherein at least one inner sun gear is operatively coupled to the gear arrangement and, either the other inner sun gear is also operatively coupled to the gear arrangement so that the inner sun gears rotate relative to one another in an equal and opposite manner, or, the other inner sun gear is fixed stationary.

The gear arrangement allows the outer ring gears to rotate freely relative to one another but only in an equal and opposite manner. (In some drive configurations, that gear arrangement is not operatively coupled to any power source and is only coupled to the planetary gear sets.) The power source into the rotating ring gears and into the inner planetary sets comes from the first and second electric motors. Although not essential, one or more smaller electric (or hydraulic) steer motor could be connected into one or both ring gears to augment the first and second electric motors if found to have insufficient power to provide both propulsion and steering. It couples the two outer planetary gear sets so as to control how they rotate relative to one another, and preferably or advantageously similarly couples the two inner sun gears so as to control how they rotate relative to one another (or rotates one relative to a fixed one), and, together with the common connection between the inner planetary gear set which fixes the rotation of an opposed pair of torque features within that planetary gear set, allows regenerative steering power to be transferred across the differential.

The gear arrangement is preferably or advantageously an at least one (orthogonally disposed) bevel gear arrangement such that rotation of the bevel gear arrangement is associated with equal amounts of rotation of the outer ring gears in mutually opposite senses. Alternatively, it may be a spur gear arrangement, for example, a series of spur gears, providing it also only permits equal amounts of rotation of the outer ring gears in mutually opposite senses.

Preferably or advantageously, the gear arrangement is provided symmetrically across upper and lower ends of the pairs of planetary gear sets. For example, where a bevel gear arrangement is used, preferably or advantageously this is a symmetrical arrangement including a pair of opposed, first and second bevel gears that are respectively operatively coupled to each side of the planetary gear sets (forming an outer cage within which the inner planetary gear set is located as nested planetary gear sets).

A bevel gear arrangement, when present, may include an outer bevel gear disposed outwardly of, and arranged to turn with, an inner bevel gear. In that case, the pair of outer ring gears are operatively coupled to the outer bevel gear such that rotation of the outer bevel gear is associated with equal and opposite rotation of the outer ring gears, whilst the pair of inner sun gears are operatively coupled to the inner bevel gear such that rotation of the inner bevel gear is associated with equal and opposite rotation of the inner sun gears. The outer and inner bevel gears may, for example, be rotationally fixed relative to one another by virtue of both being mounted on the same shaft or being formed as an integral component. Where outer and inner bevel gears are present, the outer bevel gear will usually include a pair of opposed, first and second outer bevel gears (coupled to the outer ring gears). Similarly, the inner bevel gear will usually include a pair of opposed, first and second inner bevel gears (coupled to the inner sun gears).

The first and second torque outputs may include respective output shafts, each output shaft being coupled at or near its outer ends to a drive member for driving a pair of tracks or wheels of the skid steered vehicle.

The above novel drive configuration for a skid steered vehicle provides first and second propulsion motors in drivable communication with the drive members via a differential that, in addition to allowing different speeds on each side, allows the transfer across it of regenerative steering power. In this way, propulsion and steering may be provided with only two propulsion motors and respective arrangements of planetary gear sets, without a dedicated steer motor. Since the motors are sized to provide steering and propulsion (by adjustment of their respective speeds and torques), when only straight line driving is required such motors will allow higher accelerations and higher speeds off-road and/or up steeper gradients to be attained, without the additional weight of an inactive steer motor. Although the propulsion motors will necessarily have to be larger, the arrangement therefore allows a net reduced weight and system complexity and smaller package size.

Additional planetary gear sets may be provided as gear reduction units within couplings, where desired. For example, the pair of outer sun gears may be arranged to turn with the respective rotors of the propulsion motors by a direct connection thereto, or by an indirect coupling via at least one additional planetary gear set.

Also, this arrangement of nested outer and inner differential gears with the first and second propulsion motors will allow the vehicle to perform a pivot turn about its neutral axis without the need of the propulsion motors having to shift into a lower gear to get the necessary high torques to make the turn. On a primary flat road, the vehicle can go from full speed to stop, make a pivot turn, and accelerate up to full speed again without having to make any gear changes.

The novel differential described above may be used in a series-hybrid drive configuration.

Thus, a vehicle may include the above drive configuration powered in a series-hybrid manner in which a combustion engine and generator powers the traction motors. During straight line driving, the torque output of both motors is the same, so that the torque on the left and right outer ring gears is equal and balanced against the gear arrangement. However, when steering is commanded, power supplied electrically from an in-line engine and generator is drawn from both motors, with the outer propulsion motor demanding higher torque than the inside one. This torque difference at the ring gears is applied across the central gear arrangement allowing (regenerative steering) power to be transferred across the differential.

Usually, however, a drive configuration for a skid steered vehicle will utilize the novel differential in combination with the above-mentioned power-split arrangements of some embodiments.

Thus, in a further aspect, the above drive configuration is also powered mechanically by an additional electric motor and by a combustion engine using a power-split arrangement for additional operational flexibility, as detailed above. In this way, additional mechanical or electrical power required may instead be input to the left and right sides of the vehicle via the aforementioned power split arrangement via coupling to the outer planetary gear sets of this particular differential.

Other arrangements of differential may also be used in the power split arrangements of some embodiments, as referenced above, providing that they also have the characteristic of transferring braking power across the differential.

Some other embodiments provide a vehicle including a drive configuration according to any aforementioned embodiment.

BRIEF DESCRIPTION OF THE DRAWINGS

Some embodiments will now be described by way of non-limiting example with reference to the accompanying drawings, in which.

DETAILED DESCRIPTION OF EXEMPLARY EMBODIMENTS

Figure 1:
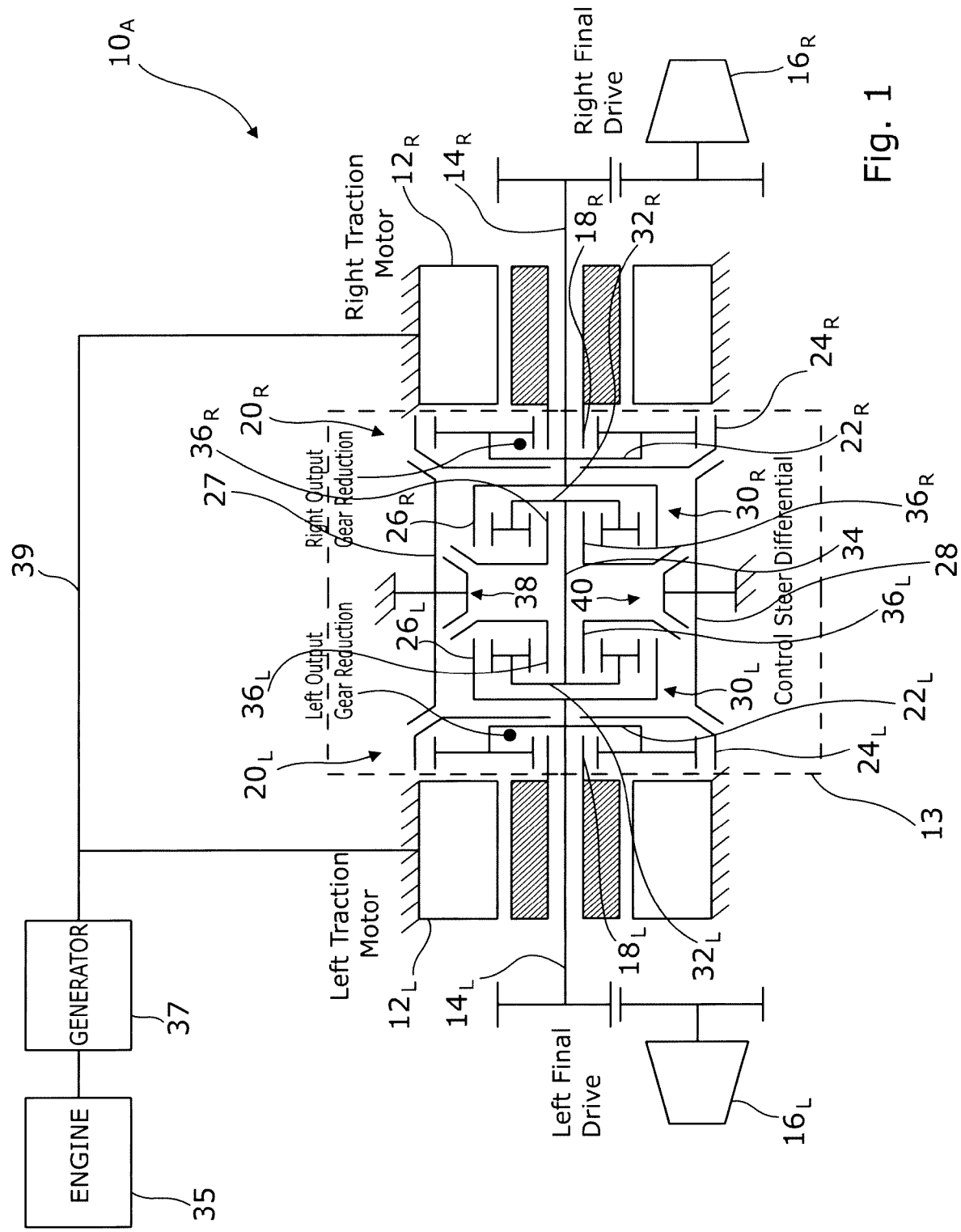
FIG. 1 is a schematic illustration of a first drive configuration.

FIG. 1 shows a drive configuration $10_A$ for a skid steered vehicle, which includes first and second electric motors $12_L$, $12_R$ arranged to rotatably drive first and second output shafts $14_L$, $14_R$. These output shafts $14_L$, $14_R$ are themselves operatively coupled via respective gear connections to drive members $16_L$, $16_R$ on opposite sides of the vehicle for driving vehicle tracks on each side of the vehicle.

The rotor of the first electric motor $12_L$ is arranged to drivingly rotate the sun gear $18_L$ of a first planetary gear set $20_L$, whereas the rotor of the second electric motor $12_R$ is arranged to drivingly rotate the sun gear $18_R$ of a second planetary gear set $20_R$. The carrier gear $22_L$ of the first planetary gear set $20_L$ is rotationally fixed to the first output shaft $14_L$, whereas the carrier gear $22_R$ of the second planetary gear set $20_R$ is rotationally fixed to the second output shaft $14_R$. The ring gear $24_L$ of the first planetary gear set $20_L$ is meshed with top and bottom bevel gears 27, 28 such that rotating the ring gear $24_L$ drives rotation of the top and bottom bevel gears 27, 28 in opposite senses, whereas the ring gear $24_R$ of the second planetary gear set $20_R$ is similarly meshed with the top and bottom bevel gears 27, 28. For the avoidance of doubt, the top and bottom bevel gears 27, 28 are arranged so as to be rotatable relative to the vehicle body, which will be described in more detail below. Initially however some additional components of the drive configuration $10_A$ will first be described.

The first and second output shafts $14_L$, $14_R$ are also rotationally fixed to the ring gears $26_L$, $26_R$ of third and fourth planetary gear sets $30_L$, $30_R$. The carrier gears $32_L$, $32_R$ of such third and fourth planetary gear sets $30_L$, $30_R$ are connected by a cross-shaft 34 and so are rotationally fixed relative to each other; that is, one cannot be rotated at a different rotational speed to the other. Finally, the sun gears $36_L$, $36_R$ of the third and fourth planetary gear sets $30_L$, $30_R$ are operatively coupled to the top and bottom bevel gears 27, 28 via additional bevel gear connections 38, 40 such that rotation of the top and bottom bevel gears 27, 28 causes rotation of the sun gears $36_L$, $36_R$ in opposite senses.

The arrangement of gears between the first and second electric motors $12_L$, $12_R$ (i.e. the differential denoted 13) is provided to assist skid steering without the need for a dedicated steer motor. In particular during a turn the differential 13 enables braking power to be transferred from the slower running (inside) track to the faster (outside) track and how this is achieved is described below. In another manner of speaking the differential 13 enables power to be mechanically transferred across it.

Figure 2:
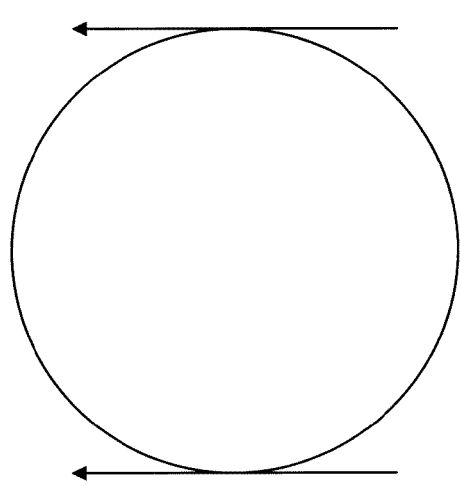
FIG. 2 is a schematic top-side view of the top bevel gear in FIG. 1.

During straight line driving the first and second electric motors $12_L$, $12_R$ are caused to run at the same speed. Torque from such motors $12_L$, $12_R$ is transferred via the first and second planetary gear sets $20_L$, $20_R$ to the drive members $16_L$, $16_R$ for propelling the vehicle. It will thus be appreciated that some torque is exerted on the ring gears $24_L$, $24_R$ during straight line driving, thereby providing that components of torque subsequently exerted by these ring gears $24_L$, $24_R$ on the top and bottom bevel gears 27, 28 are equal in magnitude but opposite in rotational direction as depicted in FIG. 2. As such, during straight line driving the top and bottom bevel gears 27, 28 do not rotate which provides that the sun gears $36_L$, $36_R$ are not driven in opposite rotational directions either.

To cause skid steering however, the driving speeds of the first and second electric motors $12_L$, $12_R$ are adjusted such that one rotates faster than the other. For instance, to skid steer to the left the rotational speed of the left-side drive member $16_L$ is reduced, whereas the rotational speed of the right-side drive member $16_R$ is increased. Running the first and second electric motors $12_L$, $12_R$ at different speeds to cause skid steering provides that different magnitudes of torque are exerted on the ring gears $24_L$, $24_R$ of the first and second planetary gear sets $20_L$, $20_R$. This induces a torque differential at both the top and bottom bevel gears 27, 28 causing them to rotate in opposite senses, which in turn via the additional bevel gear connections 38, 40 causes the sun gears $36_L$, $36_R$ of the third and fourth planetary gear sets $30_L$, $30_R$ to rotate in opposite senses also.

Since the carrier gears $32_L$, $32_R$ are rotationally linked by the cross-shaft 34 in order to equalise torque and power across each of the respective third and fourth planetary gear sets $30_L$, $30_R$ while the sun gears $36_L$, $36_R$ are rotating in opposite senses, one of the ring gears $26_L$, $26_R$ is caused to rotate faster than the other.

In particular the above described differential 13 is configured so that during a left turn skid steering operation the ring gear $26_R$ which is caused to increase in rotational speed contributes to driving rotation of the outer output shaft $14_R$ and thereby the outer track, whereas the ring gear $26_L$ which is caused to decrease in rotational speed contributes to driving rotation of the inner output shaft $14_L$ and thereby the inner track. Moreover, braking power for slowing down the inside track during a skid steer turning operation is transferred, via the cross-shaft 34, to the outside track for increasing its speed. In this manner torque and power required to both cause and maintain a difference in rotational speed of the two drive members $16_L$, $16_R$ comes from running the first and second motors $12_L$, $12_R$ at different speeds and transferring braking power from the slower running (inside) track to the faster running (outside) track.

In other words, during a skid steering operation the differential 13 provides that the difference between rotational speeds of the two electric motors $12_L$, $12_R$ will be greater than the difference between rotational speeds of the drive members $16_L$, $16_R$. It will thus be appreciated therefore, upon considering torque specifically, that due to the differential 13 the difference between the magnitudes of torque exerted by the output shafts $14_L$, $14_R$ is bigger than the difference between the magnitudes of torque output by the first and second electric motors $12_L$, $12_R$ running at different speeds. In other words, the difference between the torque outputs of the two electric motors $12_L$, $12_R$ operating at different speeds is amplified by the differential 13 and output via the output shafts $14_L$, $14_R$ to cause tracks on opposite sides of the vehicle to run at different speeds.

Negating the need for a separate, dedicated, steer motor advantageously provides that during straight line driving the vehicle will be carrying fewer components. Also, because in the heretofore described drive configuration $10_A$ steering power originates from the electric motors $12_L$, $12_R$ themselves, and not from a steering motor, it will be appreciated that more powerful motors $12_L$, $12_R$ are required to manoeuvre a vehicle at similar speeds to a vehicle provided with a drive configuration which includes a steering motor (e.g. one of the configurations in WO2014/206597A1). The provision of more powerful motors $12_L$, $12_R$ advantageously provides that during straight line driving greater acceleration and top speed can be achieved.

The electric motors $12_L$, $12_R$ Of the drive configuration $10_A$ depicted in FIG. 1 are powered in a series-hybrid manner in which a combustion engine 35 drives a generator 37 for powering the motors $12_L$, $12_R$ via an electric bus 39. Skid steered vehicles configured to be exclusively driven by electric motors in such a manner are more suited for driving at low speeds than higher speeds due to the typical torque/speed relationship of electric motors, whereby torque output decreases with increased rotational speed as illustrated by the line $T_{ELECTRIC\ MOTOR}$ in FIG. 3.

Figure 4:
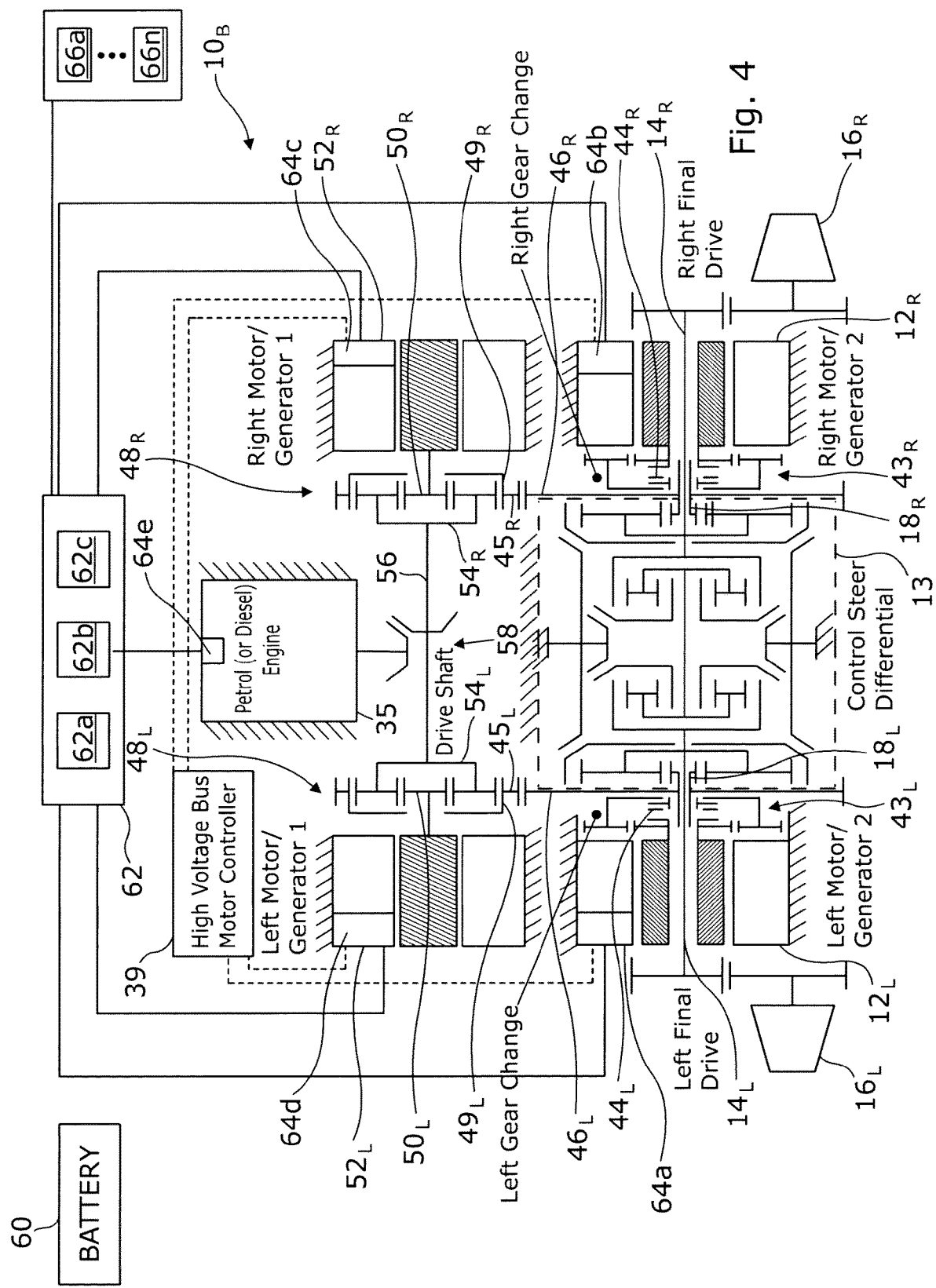
FIG. 4 is a schematic illustration of a second drive configuration.

The operational flexibility of a skid steered vehicle can though be enhanced by providing it with a drive configuration $10_B$ of the type illustrated in FIG. 4 in which a combustion engine 35 is mechanically coupled to the vehicle drive members $16_L$, $16_R$.

It will be appreciated that the maximum torque output of a typical combustion engine occurs at a higher rotational speed compared to that of an electric motor. In particular by comparing the relationships $T_{ELECTRIC\ MOTOR}$ and $T_{ENGINE}$ in FIG. 3 it will be apparent that maximum torque output of an electric motor occurs at low rotational speeds, whereas maximum torque output of a typical combustion engine occurs at higher rotational speeds, $\omega_{T,\ MAX}$ in this example). The operational flexibility of a skid steered vehicle can thus be improved by propelling it using only electric motors at slow vehicle travelling speeds but by propelling it with at least some assistance from the combustion engine 35 at higher vehicle travelling speeds.

More details about how the operational flexibility of a skid steered vehicle can be improved are set out below, although before doing so it is here mentioned that in the embodiment illustrated in FIG. 4 the differential 13 is similar to the one already described. The first and second electric motors $12_L$, $12_R$ in FIG. 4 can, however, be rotationally coupled to the sun gears $18_L$, $18_R$ either directly or via respective additional planetary gear sets $43_L$, $43_R$ depending on the position of the respective slider members $44_L$, $44_R$, whereby the additional planetary gear sets act as gear reduction units. The slider position selected will depend on the magnitude of torque required to be exerted on the first and second output shafts $14_L$, $14_R$ by the first and second electric motors $12_L$, $12_R$ at a given driving speed.

With further reference to FIG. 4 respective gears $46_L$, $46_R$ operatively connect the sun gears $18_L$, $18_R$ of the first and second planetary gear sets $20_L$, $20_R$—which form part of the differential 13—with fifth and sixth additional planetary gear sets $48_L$, $48_R$. Moreover, such gears $46_L$, $46_R$ mesh with respective external gears $45_L$, $45_R$ attached to the internal ring gears $49_L$, $49_R$ Of the fifth and sixth planetary gear sets $48_L$, $48_R$. The sun gears $50_L$, $50_R$ however of the fifth and sixth planetary gear sets $48_L$, $48_R$ are arranged to be rotatably driven by third and fourth electric motors $52_L$, $52_R$ respectively. Whereas the carrier gears $54_L$, $54_R$ of the fifth and sixth planetary gear sets $48_L$, $48_R$ are connected by a drive-shaft 56 and are rotationally fixed relative to each other; that is, one cannot be rotated at a different rotational speed to the other. The aforementioned combustion engine 35 is mechanically coupled to the drive-shaft 56 for rotating it (and thus the carrier gears $54_L$, $54_R$) via a bevel gear arrangement 58. Orienting the engine 35 at 90 degrees to the common drive-shaft 56 has packaging benefits if width of the system is a concern.

Each of the electric motors $12_L$, $12_R$, $52_L$, $52_R$ are separately connected to an electric bus 39 and are capable of drawing power from, or providing power to, a battery 60 depending on whether the respective electric motor is operated in motor mode (when the rotor drives rotation of a connected sun gear) or generator mode (when a connected sun gear drives rotation of the rotor).

During straight line driving at high vehicle travelling speeds (when some propulsion power is required from the engine 35) the rotational speeds and thereby torques of the first to fourth electric motors $12_L$, $12_R$, $52_L$, $52_R$ can be chosen such that the engine 35 can be operated at a speed which optimizes or enhances a particular operational parameter thereof (e.g. optimum efficiency, power or torque). During steering the engine can be controlled to continue operating at that speed and will provide the propulsion so torque and power, whereas the first and second electric motors $12_L$, $12_R$ can be controlled to operate at the required speed, torque and power to provide the correct output to the transmission so as to cause opposing vehicle tracks to run at different speed (depending on the required direction of turning). The third and fourth electric motors $52_L$, $52_R$ can be controlled to operate as required to balance the power and torque within the system during steering.

Figure 3:
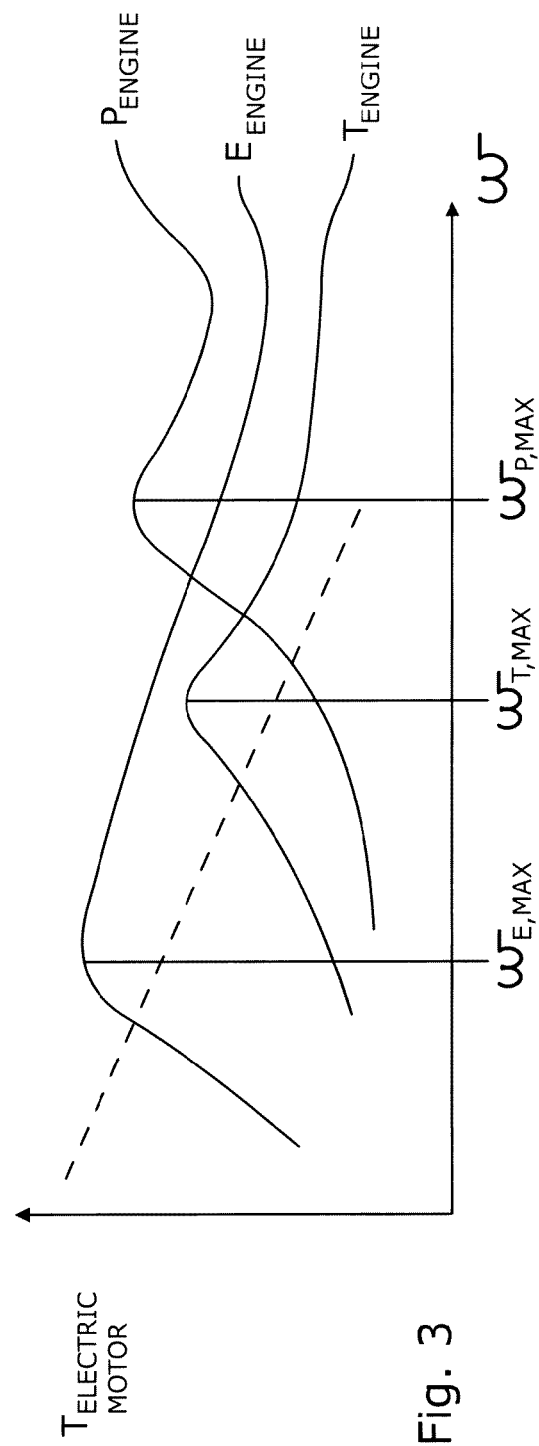
FIG. 3 illustrates the typical relationship between some operational parameters of electric motors and combustion engines with driving speed.

For instance, if when the engine 35 is running, it is required to operate at maximum engine fuel efficiency it can be controlled to be driven at $\omega_{E,\ MAX}$ (see the line $E_{ENGINE}$ in FIG. 3 illustrating the typical relationship between fuel efficiency of a combustion engine and rotational speed thereof). While the engine is driven at such a speed, the first to fourth electric motors $12_L$, $12_R$, $52_L$, $52_R$ can be controlled to provide that the vehicle drive members $16_L$, $16_R$ are driven at the appropriate speed with the appropriate torque depending on the circumstances and user demand (i.e. whether the vehicle is to be maintained at constant speed, whether the vehicle is to be accelerated, whether the vehicle is to be driven along a slope or whether the vehicle is to undergo skid steering etc.).

Also, if while the engine 35 is running, it is to be operated at maximum power output it can be controlled to be driven at $\omega_{P,\ MAX}$ (see the line $P_{ENGINE}$ in FIG. 3 illustrating the typical relationship between power output of a combustion engine and rotational speed thereof). While the engine is driven at such a speed, the first to fourth electric motors $12_L$, $12_R$, $52_L$, $52_R$ can be controlled to provide that the vehicle drive members $16_L$, $16_R$ are driven at the appropriate speed with the appropriate torque depending on the circumstances and user demand (i.e. whether the vehicle is to be maintained at constant speed, whether the vehicle is to be accelerated, whether the vehicle is to be driven along a slope or whether the vehicle is to undergo skid steering etc.).

Furthermore, if while the engine 35 is running, it is to be operated at maximum torque output it can be controlled to be driven at $\omega_{T,\ MAX}$ (see the line $T_{ENGINE}$ in FIG. 3 illustrating the typical relationship between torque output of a combustion engine and rotational speed thereof). While the engine is driven at such a speed, the first to fourth electric motors $12_L$, $12_R$, $52_L$, $52_R$ can be controlled to provide that the vehicle drive members $16_L$, $16_R$ are driven at the appropriate speed with the appropriate torque depending on the circumstances and user demand (i.e. whether the vehicle is to be maintained at constant speed, whether the vehicle is to be accelerated, whether the vehicle is to be driven along a slope or whether the vehicle is to undergo skid steering etc.).

To enable the foregoing a computer 62 is connected to rotational speed sensors 64a to 64e for receiving information indicative of the rotational speed and direction of each of the first to fourth electric motors $12_L$, $12_R$, $52_L$, $52_R$ and the engine 35. The computer 62 is also connected to a plurality of sensors 66a to 66n, some of which transmit to the computer 62 information indicative of user input for controlling vehicle motion (e.g. sensors for generating information indicative of steering wheel manipulation, accelerator pedal manipulation and brake pedal manipulation or otherwise for instance) and some others of which are described in more detail below (one of which could be e.g. a tilt sensor). Based on information received by the computer 62 a controller 62a thereof, in conjunction with both volatile and non-volatile memory 62b, 62c, determines the performance of each of the first to fourth electric motors $12_L$, $12_R$, $52_L$, $52_R$ required to cause the desired vehicle motion while causing the engine 35 to be operated at a speed which optimizes or enhances a specific parameter thereof (e.g. output power, output torque or fuel efficiency as above).

Moreover, in a first operational mode only the first and second electric motors $12_L$, $12_R$ are used to drive rotation of the output shafts $14_L$, $14_R$ and thereby propel and steer a vehicle as heretofore described, during which time the third and fourth electric motors $52_L$, $52_R$ operate in coast mode and the engine 35 remains off. In a second operational mode however the above described functionality is implemented by the controller 62a, in which the third and fourth electric motors $52_L$, $52_R$ are energized and the combustion engine 35 is running. Transition from the first to the second operational mode occurs when rotational speed of at least one of the third and fourth electric motors $52_L$, $52_R$ operating in coast mode exceeds a threshold amount $S_{START}$ during vehicle motion, which is determined by the controller 62a based on information generated by the rotational speed sensors 64c and 64d.

Figure 5:
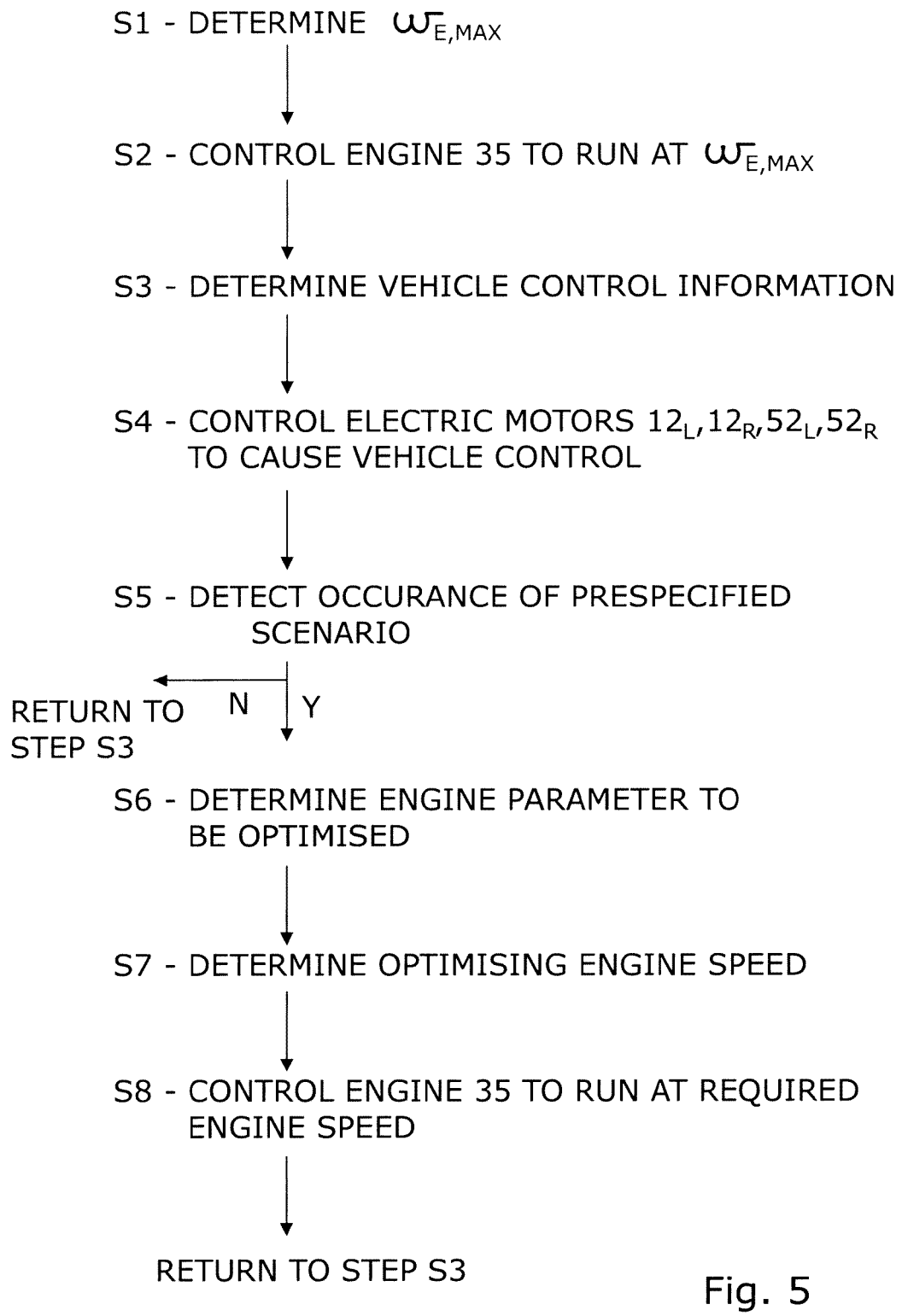
FIG. 5 is a method implemented by the drive configuration in FIG. 4.

In some embodiments upon transitioning into the second operational mode in which the third and fourth electric motors $52_L$, $52_R$ are energized and the combustion engine 35 is started, the method illustrated in FIG. 5 is implemented.

In step S1 the controller 62a determines the engine running speed required to operate at maximum engine fuel efficiency $\omega_{E,\ MAX}$, which could involve obtaining such information from a lookup table stored in the non-volatile memory 62c during manufacture.

In step S2 the controller 62a transmits control information to the engine 35 for controlling it to run at $\omega_{E,\ MAX}$.

In step S3 the controller 62a processes information generated by the sensors 66a to 66n for determining vehicle control information, in other words, to determine how the driver/user is controlling the vehicle (e.g. which way they are steering, whether they are applying the vehicle throttle (and to what extent) and whether the brake pedal is applied).

In step S4 based on the determined vehicle control information, knowledge of the speed at which the engine 35 is operating, and knowledge of the rotational speed and direction of each of the electric motors $12_L$, $12_R$, $52_L$, $52_R$ (based on information output from the rotational speed sensors 64a to 64d) the controller 62a is able to determine appropriate rotational speeds and directions of each of the first to fourth electric motors $12_L$, $12_R$, $52_L$, $52_R$ for causing the required vehicle motion and then subsequently transmitting control information to the electric motors $12_L$, $12_R$, $52_L$, $52_R$ for controlling them to operate accordingly to give rise to the required vehicle motion. In doing so the controller 62a uses information stored in the non-volatile memory 62c during manufacture concerning the gearing relationships between components of the drive configuration $10_B$.

In step S5 the controller 62a determines whether a pre-specified scenario has occurred based on information received from the sensors connected to the computer 62 (i.e. the rotational speed sensors 64a to 64e and other sensors 66a to 66n one of which could be a tilt sensor, a transducer operable by a user or an engine temperature sensor for instance). Step S5 for example could involve determining that a max-power button or otherwise has been pressed by a user; one of the sensors 66a to 66n including such an input device. Upon implementing step S5 if "no" is determined (i.e. no pre-specified scenario is detected to have occurred) the controller returns to step S3, whereas if "yes" the method continues to step S6.

In step S6 the controller 62a determines the specific engine parameter 35 to be optimized or enhanced. This can involve referring to a lookup table stored in the non-volatile memory 62c during manufacture which associates respective occurrences with an engine parameter to be optimized or enhanced. In this example, selection of a max-power button is associated with maximum engine power and information indicative of the engine operating speed at $\omega_{P,\,MAX}$ at which maximum power output occurs.

In step S7 the controller 62a reads the information indicative of the engine speed required to optimize or enhance the required parameter, in this example power output.

In step S8 the controller 62a transmits control information to the engine 35 (or an engine controller thereof) for controlling it to run at the required speed, in this example $\omega_{P,\,MAX}$, before returning to step S3.

On subsequent iterations of the method, in step S5 the controller 62a may determine that the aforementioned max-power button has been deselected and in response to this the engine 35 could be caused to return to running at $\omega_{E,\,MAX}$, the speed at which maximum engine fuel efficiency is realised.

It will be appreciated that a variety of other situations could be detected to have occurred upon implementing step S5 depending on how the vehicle is configured at manufacture to respond to certain situations. For example, if a user is detected to have stomped on an accelerator pedal abruptly rather than squeeze it gently, determined based on output from one or more of the sensors 66a to 66n, the controller 62a could in response cause the engine 35 to begin operating at maximum power output. In another example if the vehicle is detected to be on an inclined surface (one or more of the sensors 66a to 66n could be a tilt sensor) and losing speed above a threshold rate then the controller 62a could in response cause the engine 35 to be operated at $\omega_T$, the speed at which maximum torque output occurs. In a further example if the vehicle is determined to be low on fuel in step S5 based on output from one or more of the sensors 66a to 66n the controller 62a could in response restrict the engine 35 from being operated at speeds other than $\omega_{E,\,MAX}$, the speed at which maximum engine fuel efficiency is realised. In another example if the engine 35 is determined to be overheating the controller 62a could in response control the engine 35 to be operated in a low speed mode until it cools below a pre-specified temperature, whereby such a low speed need not necessarily be associated with a peak in one or other operational parameters of the engine 35. Again though, a variety of other situations could be detected to have occurred upon implementing step S5 depending on how the vehicle is configured at manufacture to respond to certain situations.

During time when step S5 is not specifically being implemented the controller 62a could, in the background, monitor the occurrence of a scenario specified in information pre-stored in the non-volatile memory 62c during manufacture and if such a scenario is detected a flag or other indicator could be stored in the volatile memory 62b that is subsequently acknowledged when step S5 is implemented and appropriate action taken based on what scenario the flag is indicative of. Different scenarios could have differing levels of priority such that in subsequent steps S6 to S8 action is taken to account for occurrence of the detected scenario having the highest priority, unless it has been cancelled out in the meantime by other action taking place between the detected occurrence and implementation of step S5, such as deselection of the max-power button or returning to a substantially flat vehicle travelling surface etc.

Upon designing a vehicle, the manufacturer is free to program the computer 62 as necessary and include whatever sensors 66a to 66n are required for the controller 62a to detect the occurrence of any particular situations and to react accordingly. As such it will be appreciated that the foregoing teaching includes just a few examples of some situations the computer 62 may be configured to monitor for and how the controller 62a might be caused to respond.

The method illustrated in FIG. 5 can be ended at any time the controller 62a determines that the vehicle could be driven in a user requested manner using solely the first and second electric motors $12_L$, $12_R$, whereby upon ending the method the third and fourth electric motors $52_L$, $52_R$ return to operating in coast mode and the engine 35 is switched off.

In use the drive configuration $10_B$ in FIG. 4 will provide propulsion power and, due to provision of the heretofore described differential 13, cross transfer of regenerative steering power. It is envisioned that the drive configuration $10_B$ illustrated in FIG. 4 can be provided as a single unit and then retrofitted into existing platforms without a significant change to the existing vehicle platform structure. It is to be noted however that use of the specific differential 13 heretofore described is not strictly necessary and other types of differential could be used instead provided that it is capable of providing cross transfer of regenerative steering power, or in other words, provided it is capable of transferring braking power from the inside vehicle track during skid steering to the outside vehicle track. Various types of differential are described in WO2014/206597A1 which require the use of steering motors, wherein such motors could be connected to the computer 62 in a similar manner to the other electric motors $12_L$, $12_R$, $52_L$, $52_R$ heretofore described and provided with rotational speed sensors such that the computer 62 can determine and control their rotational speeds and directions to give rise to intended vehicle motion while the engine 35 is running at a specific speed.

Figure 6:
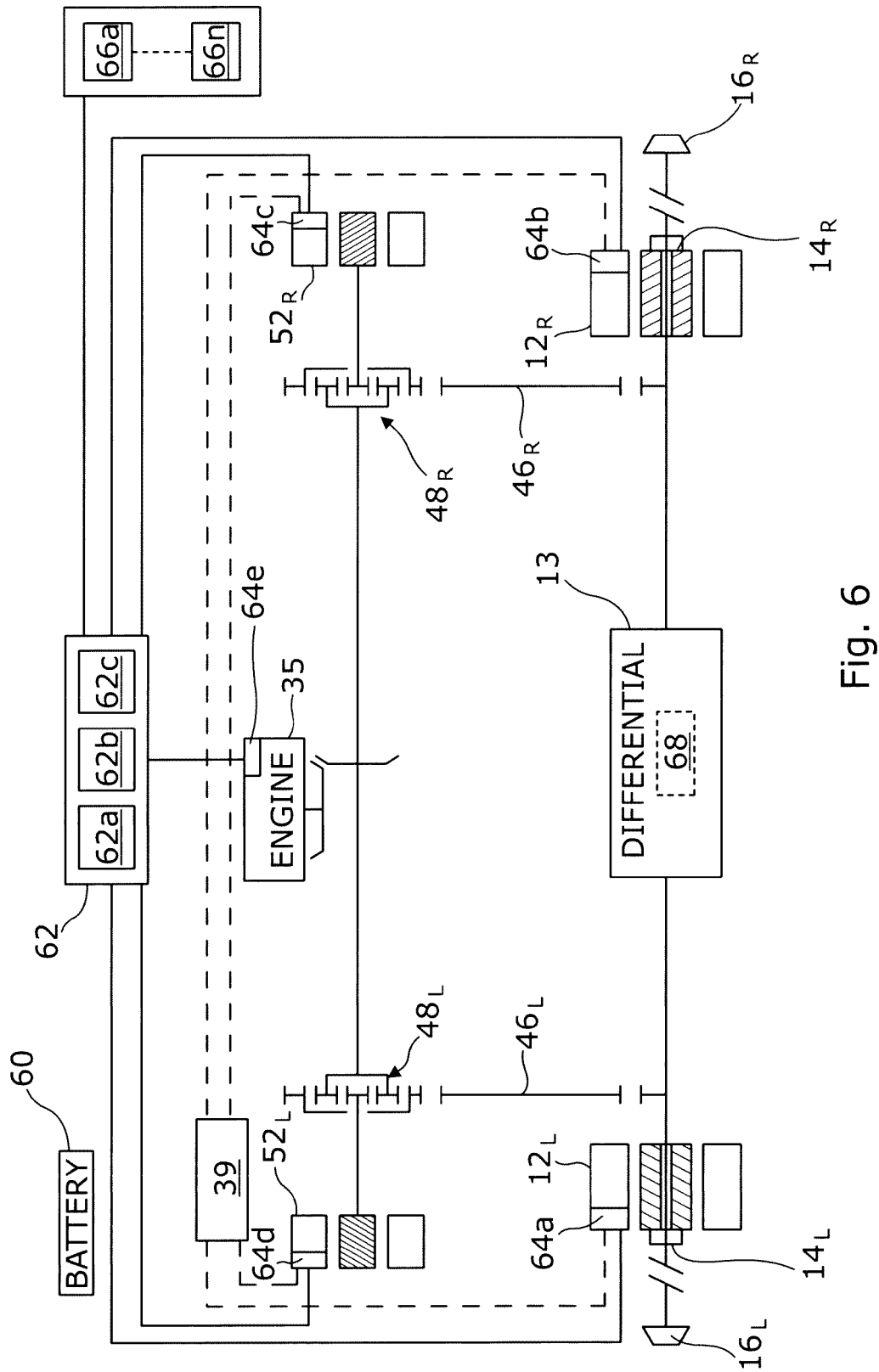
FIGS. 6 to 10 are schematic illustrations of third to seventh drive configurations.

To illustrate the extent of generality of the foregoing teaching FIG. 6 schematically illustrates a drive configuration $10_C$ similar to that in FIG. 4, however in FIG. 6 the rotors of the first and second electric motors $12_L$, $12_R$ are connected directly to the first and second output shafts $14_L$, $14_R$. It will be recalled from the foregoing teaching however that the rotors could instead be connected to the first and second output shafts $14_L$ via a gear reduction unit including at least one planetary gear set $43_L$, $43_R$, wherein the gear reduction unit could include gear selection functionality $44_L$, $44_R$. FIG. 6 also clearly illustrates that the differential 13 need not necessarily have a specific structure provided that it is capable of transferring braking power from the inside vehicle track during skid steering to the outside vehicle track. As mentioned in the foregoing paragraph, the differential 13 may in some embodiments require the use of one or more steering motors which are denoted 68 in FIG. 6 and are merely optional depending on the specific differential arrangement used.

Figure 7:
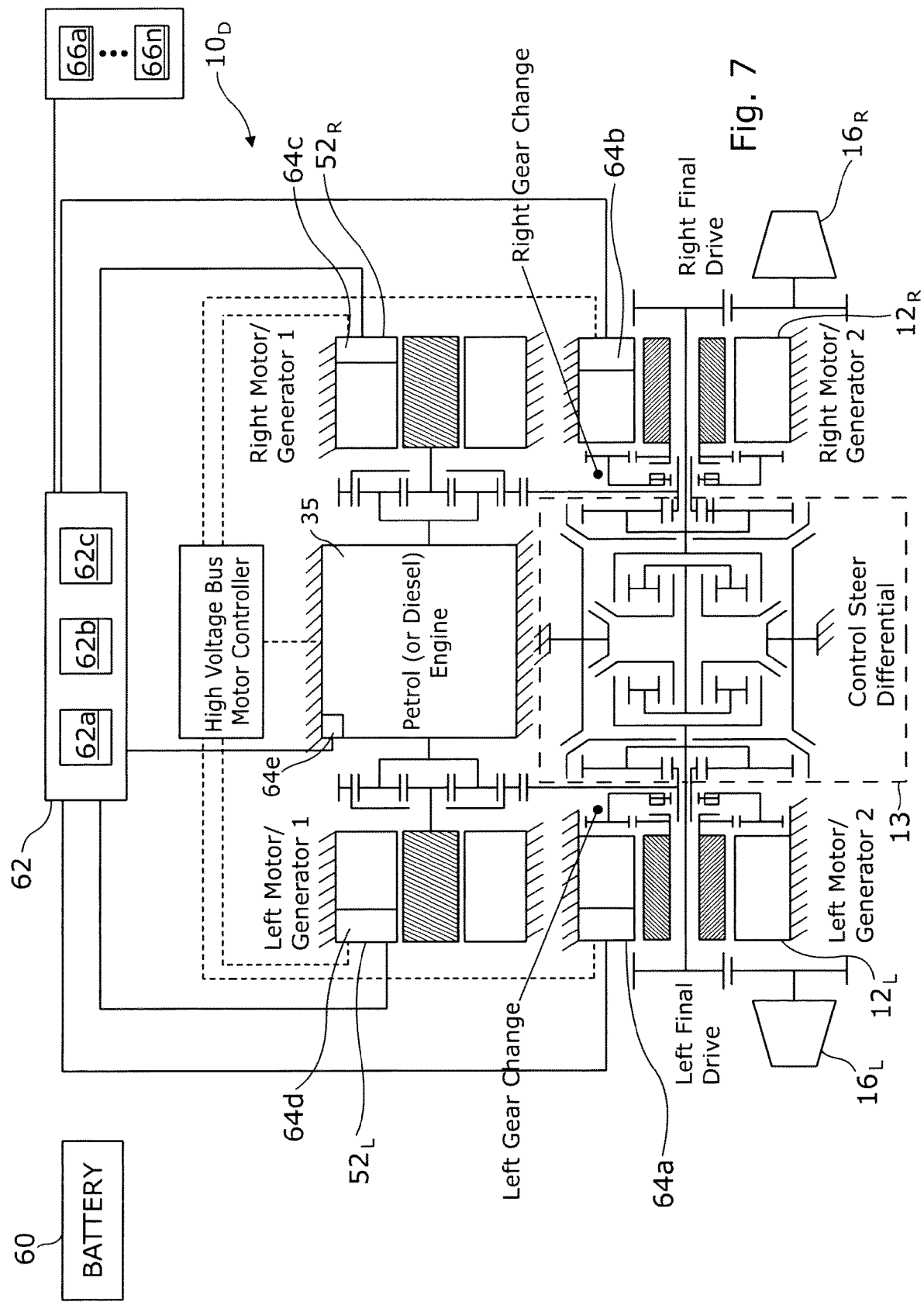

Furthermore, it is possible that the engine 35 could be mechanically coupled to the drive-shaft 56 in different ways, for example in the manner of the drive configuration $10_D$ in FIG. 7 with all other features being similar to those already described in connection with the drive configuration $10_B$. During skid steering the total output torque and power of the engine 35 will be split between the left and right side. For a turn to the left where more power is required on the outside track, power and torque out of the right side of the engine will be higher than on the left output of the engine 35. For a turn to right where more power is required on the outside track, power and torque out of the left side of the engine will be higher than on the right output of the engine 35. The first to fourth electric motors $12_L$, $12_R$, $52_L$, $52_R$ will be controlled to collectively balance the power and torque throughout the system while the engine 35 is operated at a particular speed which optimizes or enhances an operational parameter thereof in the manner heretofore described.

Figure 8:
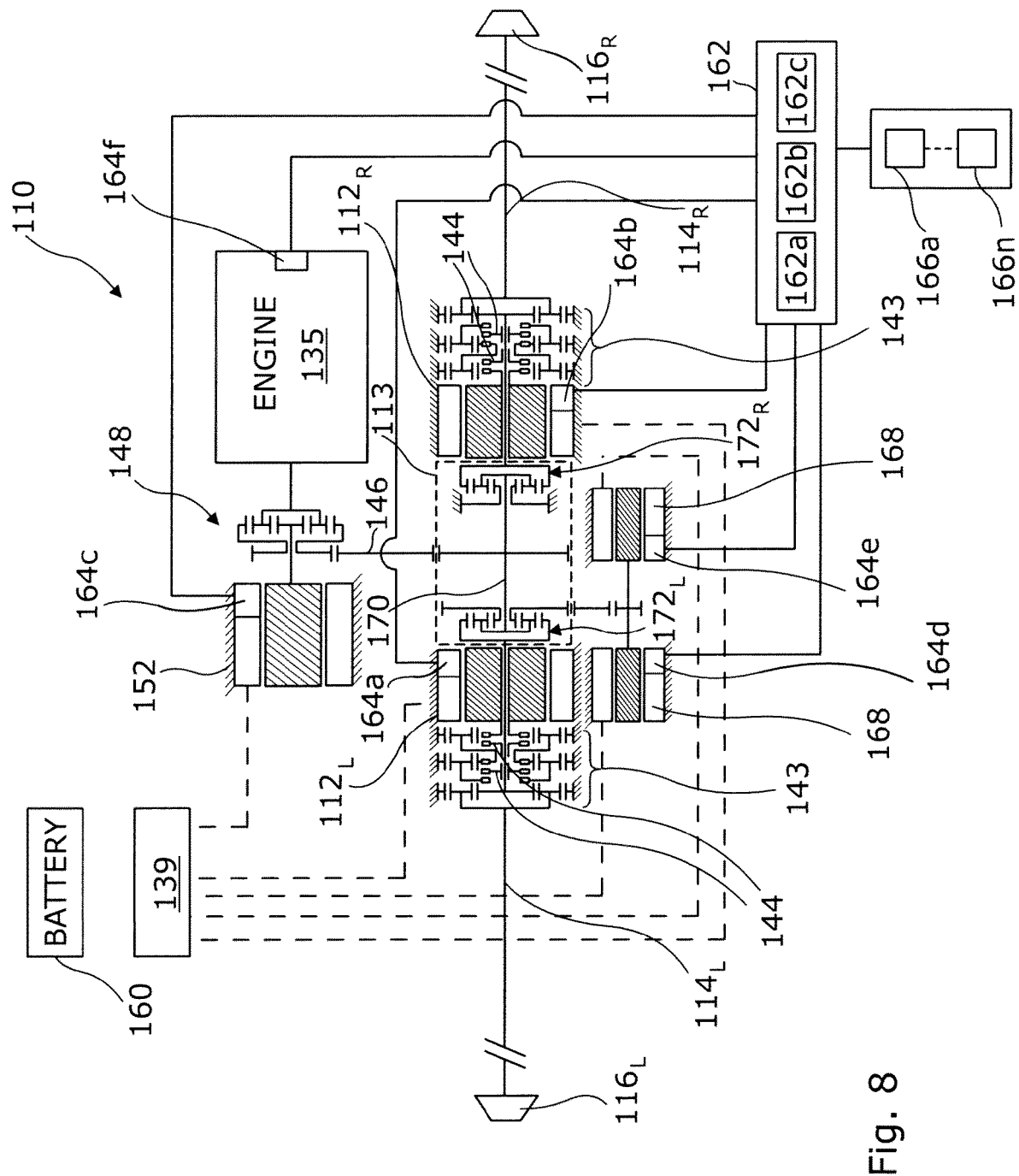

In some embodiments the engine may only cooperate with a single electric motor such as in the drive configuration embodiment 110 illustrated in FIG. 8, in which all features similar to those heretofore described are denoted with like reference numerals increased by 100. The engine 135 is connected to the carrier gear of the planetary gear set 148, whereas the electric motor 152 is connected to the sun gear thereof and the ring gear is in a torque connection with a cross shaft 170 of a differential 113. This cross shaft 170 is connected to the carrier gears of planetary gear sets $172_L$, $172_R$ located on opposite sides of the differential 130. The sun gear of one of the planetary gear sets $172_L$, $172_R$ is in a torque connection with steering motors 168, whereas the ring gears of both planetary gear sets $172_L$, $172_R$ are in a torque connection with output shafts $114_L$, $114_R$ on opposite sides of the drive configuration, which, are in a torque connection with vehicle drive members $116_L$, $116_R$ (e.g. sprockets for engaging vehicle tracks) on opposite sides of the vehicle. First and second electric motors $112_L$, $112_R$ are also arranged in a torque connection with the output shafts $114_L$, $114_R$ for enabling the vehicle drive members $116_L$, $116_R$ to be rotatably driven. The drive configuration 110 is additionally arranged such that torque flowing from the electric motors $112_L$, $112_R$ and the differential 130 in the direction of the output shafts $114_L$, $114_R$ is required to flow through a gear reduction unit 143 including a plurality of planetary gear sets arranged in series with gear selection functionality 144 (i.e. sliders as heretofore described for selecting how many planetary gear sets torque flows through in use). Moreover, torque flowing from the differential 113 in the direction of the output shafts $114_L$, $114_R$ flows through the outermost planetary gear set of the gear reduction unit 143, whereas the sliders can be moved to change how many planetary gear sets torque flowing so from the first and second electric motors $112_L$, $112_R$ cascades through.

During straight line driving in a first operational mode (with the electric motor 152 in coast mode and the combustion engine 135 switched off) the first and second electric motors $112_L$, $112_R$ operate at the same speed. Energising the steering motors 168 during vehicle propulsion solely by the first and second electric motors electric motors $112_L$, $112_R$ will impart a difference to the rotational speeds of the ring gears of the planetary gear sets $172_L$, $172_R$ of the differential 113. As such the output shafts $114_L$, $114_R$, drive members $116_L$, $116_R$ and thereby vehicle tracks will be driven at different speeds giving rise to skid steering in a direction dependent on the direction of rotation of the steering motors 168. Moreover, due to the differential cross shaft 170 being rotationally fixed to the carrier gears on opposite sides thereof—that is the carrier gears are restricted to rotating at the same rotational speed—braking power for slowing down the inside track during a skid steering operation is transferred to the outside track for increasing its driving speed.

When rotational speed of the rotor of the coasting electric motor 152 is determined to be above a threshold speed $S_{START}$ determined by the controller 162a based on output from the rotational speed sensor 164c the vehicle transitions into a second operational mode. In this mode the engine 135 is started, the electric motor 152 is energised and performance of drive configuration components is controlled on the basis of instructions pre-stored on the vehicle during manufacture similarly as heretofore described. In more detail a computer 162 is connected to rotational speed sensors 164a to 164f for receiving information indicative of the rotational speed and direction of each of the electric motors $112_L$, $112_R$ and 152, the steering motors 168, 168 and the engine 135. The computer 162 is also connected to a plurality of sensors 166a to 166n similarly as heretofore described for receiving information indicative of user input for controlling vehicle motion (e.g. sensors for generating information indicative of steering wheel manipulation, accelerator pedal manipulation and brake pedal manipulation or otherwise for instance) and other circumstances (e.g., tilt or engine temperature etc.). Based on information received by the computer 162 a controller 162a thereof, in conjunction with both volatile and non-volatile memory 162b, 162c, determines the performance of each of the electric motors $112_L$, $112_R$ and 152 and the steering motors 168 required to cause the desired vehicle motion while causing the engine 135 to be operated at a particular rotational speed which, optionally depending on the circumstances, is associated with a peak in an operational parameter of the engine 135. Again, it will be appreciated that upon designing a vehicle the manufacturer is free to program the computer 162 as necessary and include whatever sensors 166a to 166n are required for the controller 162a to detect the occurrence of any particular situations and to react accordingly.

Figure 9:
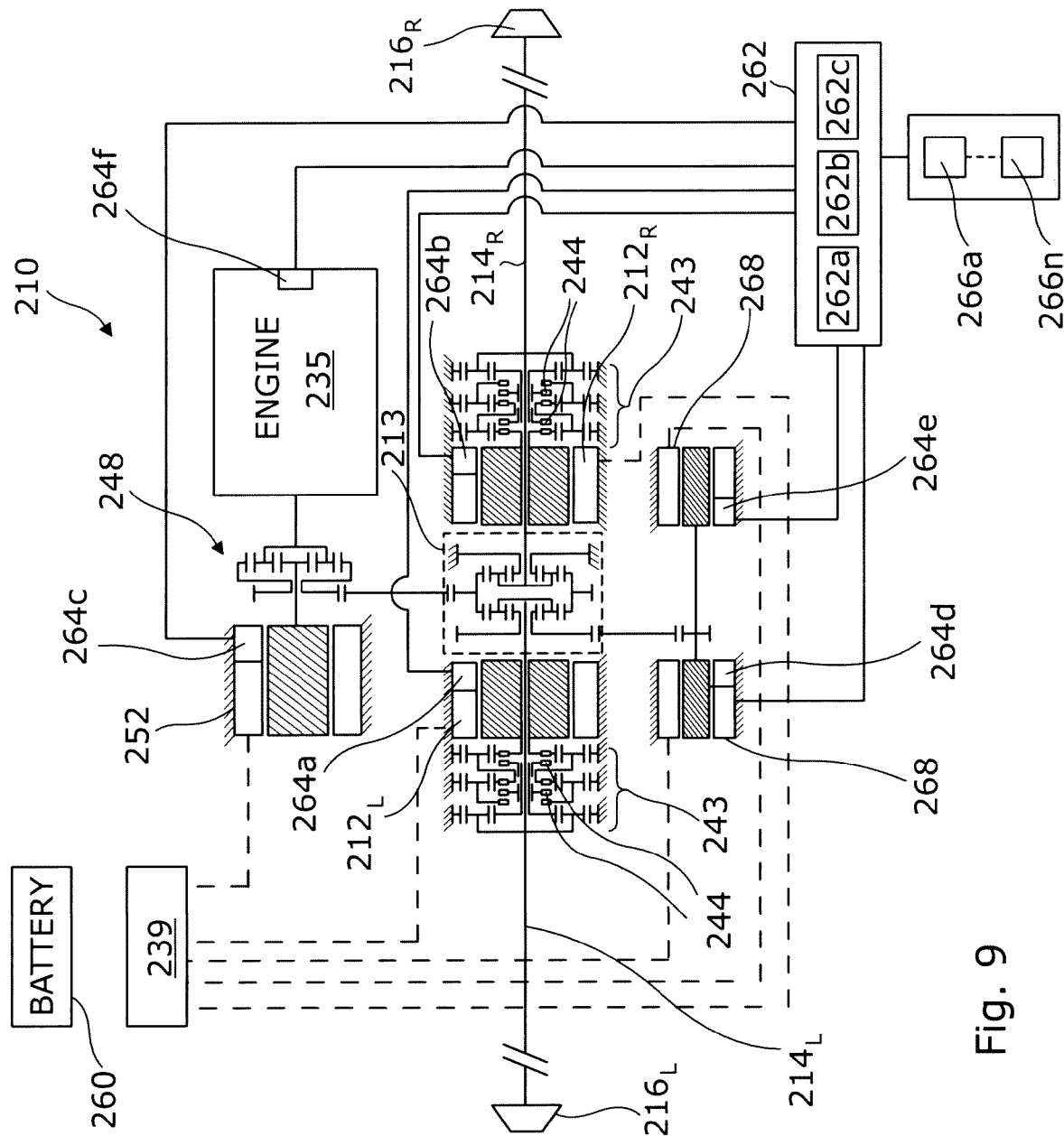

FIG. 9 illustrates another drive configuration embodiment in which the engine cooperates with a single electric motor, in which all features similar to those heretofore described are denoted with like reference numerals again increased by 100. The engine 235 is connected to the carrier gear of the planetary gear set 248, whereas the electric motor 252 is connected to the sun gear thereof and the ring gear is in a torque connection with a common ring gear of a differential 213. This common ring gear cooperates with opposing sets of planetary gears. The sun gear of one side of the differential 213 is in a torque connection with steering motors 268, whereas the carrier gears on both sides of the differential 213 are in a torque connection with output shafts $214_L$, $214_R$ on opposite sides of the drive configuration, which, are in a torque connection with vehicle drive members $216_L$, $216_R$ (e.g. sprockets for engaging vehicle tracks) on opposite sides of the vehicle. First and second electric motors $212_L$, $212_R$ are also arranged in a torque connection with the output shafts $214_L$, $214_R$ for enabling the vehicle drive members $216_L$, $216_R$ to be rotatably driven, although torque flowing from the electric motors $212_L$, $212_R$ in the direction of the output shafts $214_L$, $214_R$ is required to flow through a gear reduction unit 243 including a plurality of planetary gear sets arranged in series with gear selection functionality 244 (i.e. sliders for selecting how many planetary gear sets torque flows through in use). The sliders can be moved to change how many planetary gear sets torque flowing from the first and second electric motors $212_L$, $212_R$ cascades through.

During straight line driving in a first operational mode (with the electric motor 252 in coast mode and the combustion engine 235 switched off) the first and second electric motors $212_L$, $212_R$ operate at the same speed. Energising the steering motors 268 during vehicle propulsion solely by the first and second electric motors $212_L$, $212_R$ will impart a difference to the rotational speeds of the carrier gears on opposite sides of the differential 213. As such the output shafts $214_L$, $214_R$, drive members $216_L$, $216_R$ and thereby vehicle tracks will be driven at different speeds giving rise to skid steering in a direction dependent on the direction of rotation of the steering motors 268. Moreover, due to the common ring gear between features on opposite sides of the differential 213 braking power for slowing down the inside track during a skid steering operation is transferred to the outside track for increasing its driving speed.

When rotational speed of the coasting electric motor 252 is determined to be above a threshold speed $S_{START}$ determined by the controller 262a the engine 235 is started, the electric motor 252 is energised and performance of drive configuration components is controlled on the basis of instructions pre-stored on the vehicle during manufacture similarly as heretofore described. Moreover, a computer 262 is connected to rotational speed sensors 264a to 264f for receiving information indicative of the rotational speed and direction of each of the electric motors $212_L$, $212_R$ and 252, the steering motors 268, 268 and the engine 235. The computer 262 is also connected to a plurality of sensors 266a to 266n similarly as heretofore described for receiving information indicative of user input for controlling vehicle motion (e.g. sensors for generating information indicative of steering wheel manipulation, accelerator pedal manipulation and brake pedal manipulation or otherwise for instance) and other circumstances (e.g. tilt or engine temperature etc.). Based on information received by the computer 262 a controller 262a thereof, in conjunction with both volatile and non-volatile memory 262b, 262c, determines the performance of each of the electric motors $212_L$, $212_R$ and 252 and the steering motors 268 required to cause the desired vehicle motion while causing the engine 235 to be operated at a particular rotational speed which, optionally depending on the circumstances, optimizes or enhances an operational parameter of the engine 255. Again, it will be appreciated that upon designing a vehicle the manufacturer is free to program the computer 262 as necessary and include whatever sensors 266a to 266n are required for the controller 262a to detect the occurrence of any particular situations and to react accordingly.

Figure 10:
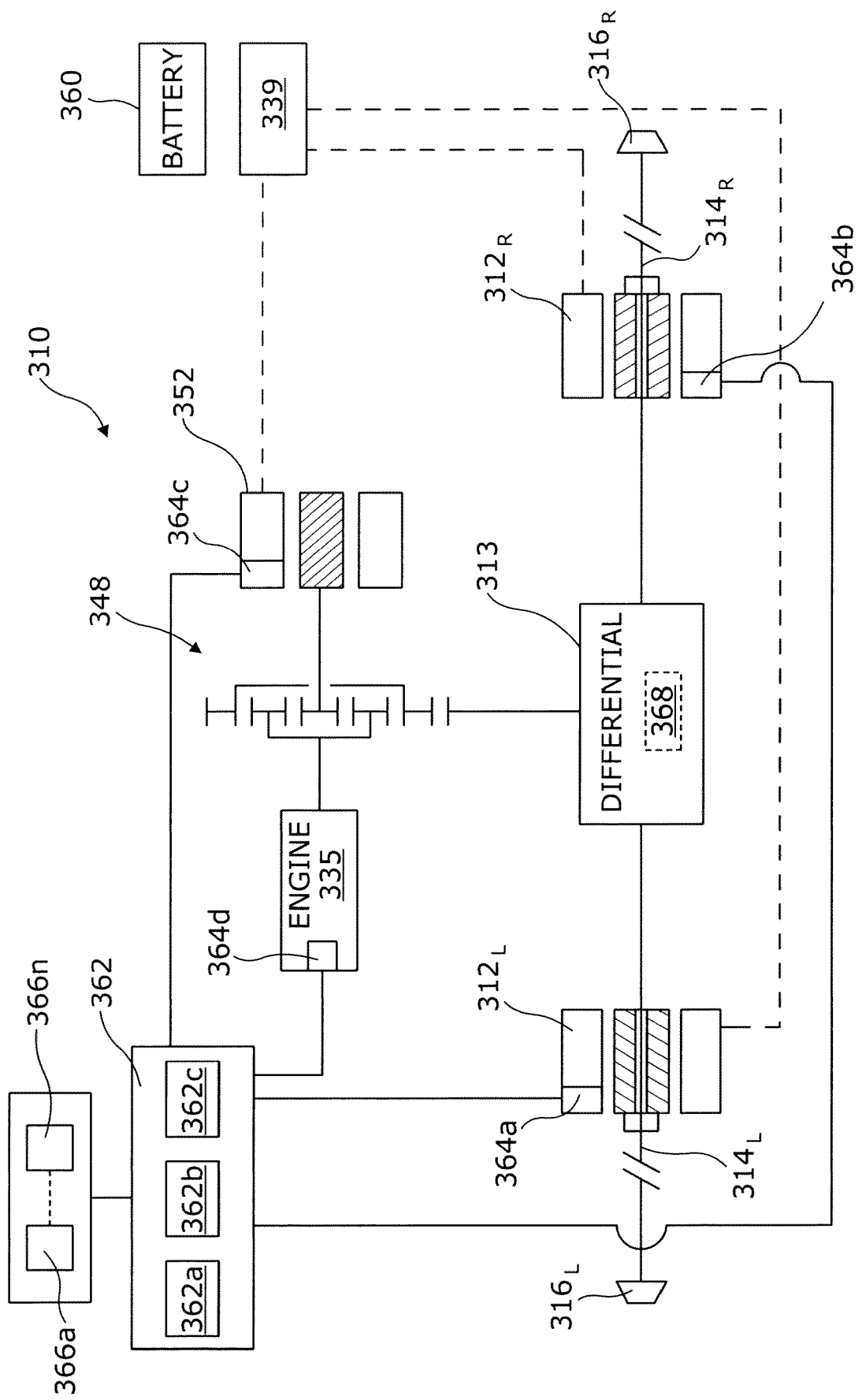

To illustrate the extent of generality of the foregoing teaching FIG. 10 schematically illustrates a drive configuration 310 similar to that in FIG. 9 in which all features similar to those heretofore described are denoted with like reference numerals again increased by 100. In the embodiment illustrated in FIG. 10 however the rotors of the first and second electric motors $312_L$, $312_R$ are connected directly to the first and second output shafts $314_L$, $314_R$. It will be recalled from the foregoing teaching however that the rotors could instead be connected to the first and second output shafts $314_L$ via a gear reduction unit including at least one planetary gear set, wherein the gear reduction unit could include gear selection functionality (e.g. the gear reduction unit 243 in FIG. 9 having sliders 244). FIG. 10 also clearly illustrates that the differential 313 need not necessarily have a specific structure provided that it is capable of transferring braking power from the inside vehicle track during skid steering to the outside vehicle track; and provided that the planetary gearset 348 is in a torque connection with a common feature linking components on one side of the differential 313 with those on the other side thereof. Such a differential 313 may be provided in the absence of steering motors, such as the differential described in connection with FIG. 4. Alternatively, however in some embodiments the differential 313 may be arranged in conjunction with steering motors, such as the differentials described in connection with FIGS. 8 and 9. The steering motors which are denoted 368 in FIG. 10 are thus merely optional depending on the specific differential arrangement used.

It will be appreciated that whilst various aspects and embodiments of the presently disclosed subject matter have heretofore been described, the scope of some embodiments is not limited to the embodiments set out herein and instead extends to encompass all arrangements, and modifications and alterations thereto, which fall within the spirit and scope of the appended claims.

For example, in some embodiments two or more engines could be connected in parallel to the drive-shaft 56 in FIG. 4 if more power is required.

The differential described in connection with FIGS. 1 and 4 need not necessarily have the exact same configuration as heretofore described, provided that it is still capable of enabling vehicle drive members on opposite sides of a vehicle to be rotatably driven a different speeds and is still capable of transferring braking power from one side of a drive configuration to the other during a skid steering operation. For example, the top and bottom bevel gears 27, 28 could be operatively coupled to the sun gears $36_L$, $36_R$ in various different ways that will be apparent to persons skilled in the art upon reading the foregoing disclosure. Furthermore, respective input/output features of the third and fourth planetary gear sets $30_L$, $30_R$ (i.e. sun gear, ring gear, carrier) could be arranged differently. In particular, considering just the third planetary gearset $30_L$, generally speaking any of its respective inputs/output could be operatively coupled to the first output shaft $14_L$, whereas another input/output could be operatively coupled to the top and bottom bevel gears 27, 28 and the remaining input/output could be could rotationally fixed relative to the corresponding feature of the fourth planetary gear set $30_R$. The same applies to the fourth planetary gear set $30_R$.

As for the planetary gear sets denoted $48_L$, $48_R$, 148, 248, 348 respective inputs/outputs thereof (i.e. sun gear, ring gear, carrier) could be arranged differently. In particular, considering just the fifth planetary gearset $48_L$ in FIG. 4, generally speaking any of its respective inputs/outputs could be operatively coupled to the motor $52_L$, whereas another of its inputs/outputs could be operatively coupled to the external gear $45_L$ and the remaining of its inputs/outputs could be could rotationally fixed to the corresponding feature of the sixth planetary gearset $48_R$ via the drive-shaft 56.

In some embodiments, if gear selection functionality is provided (i.e. sliders 44 for changing how many planetary gear sets torque flows through in use) the heretofore described functionality can include the additional steps of determining an appropriate gear (i.e. appropriate slider positions) and controlling the position of respective sliders to select the appropriate gear. For example, step S4 in FIG. 5 could include sub-steps for implementing such functionality or alternatively such functionality could be performed in a step S3a preceding step S4. Moreover, in some embodiments the positions of sliders (if provided) can be changed whether by manual user gear selection upon manipulating a gear stick for instance if operating in a "manual" mode, or alternatively by automatic control if operating in an "automatic" mode.

Steps S1 and S2 in FIG. 5 need not necessarily involve controlling the engine 35 to operate a maximum fuel efficiency and instead could involve controlling the engine 35 to be operated at a default speed, which could be selected by a user.

Depending on the circumstances, it might not be desirable to control the engine to operate at a speed which optimizes or enhances a particular operational parameter thereof. Instead, it might be more desirable to control the engine to operate at another rotational speed, such as a speed along the typical $P_{ENGINE}$ or $T_{ENGINE}$ relationship illustrated in FIG. 3 which is not $\omega_{P,\,MAX}$ (at which maximum engine power output occurs) or $\omega_{T,\,MAX}$ (at which maximum engine torque occurs). This can provide that a higher or lower proportion of required vehicle driving torque originates from electric motors, which could be more energy efficient or give more total propulsion power or torque depending on the circumstances detected by the heretofore described controller from input generated by drive configuration sensors (i.e. rotational speed sensors and other sensors discussed previously such as those denoted 66a to 66n in FIG. 4). In view of the foregoing therefore, steps S6 to S8 in FIG. 5 could, more broadly, instead of causing the engine to operate at a speed which optimizes or enhances a particular operational parameter thereof, cause it to be controlled at a rotational speed dependant on the pre-specified scenario detected to have occurred and the corresponding required result (i.e. how the computer is programmed to react to that scenario).

Furthermore, in some embodiments the controller of a drive configuration may control operation of various components even when the heretofore mentioned threshold rotational speed $S_{START}$ has not been exceeded. For example, when propelling a vehicle solely using first and second electric motors (e.g. the motors denoted $12_L$ and $12_R$ in FIG. 4) if the controller determines that battery power is low (e.g. if the battery 60 in FIG. 4 is charged below a threshold amount) then the controller can take action to charge the battery up. For example, it can, in response to such a determination, cause switching on of the combustion engine such that it drives rotation of one or more electric motors (e.g., the electric motors denoted $52_L$, $52_R$ in FIG. 4) in generator mode for charging the battery; whereas at the same time the other electric motors (e.g., the motors denoted $12_L$ and $12_R$ in FIG. 4) are controlled so as to give rise to intended vehicle motion.

Finally, although the foregoing has been set out in the context of tracked vehicles, aspects and embodiments of the presently disclosed subject matter can similarly be applied in the context of skid-steered wheeled vehicles.

The invention claimed is:

1. A drive configuration for a skid steered vehicle, comprising:
   first and second torque outputs that are coupled by a differential and in a torque connection with first and second electric motors, respectively, the differential being configured to mechanically transfer power across itself;
   at least one mechanical power splitter having a first torque transfer feature in a torque connection with a combustion engine, a second torque transfer feature in a torque connection with a respective additional electric motor, and a third torque transfer feature in a torque connection with at least one of the first and second torque outputs of the drive configuration, either directly or indirectly via the differential, torque output from the at least one mechanical power splitter in use is dependent on torques generated by the combustion engine and the associated additional electric motor; and
   a controller is configured selectively to control the respective speeds and torques of the first, second and third torque transfer features of the mechanical power splitter.

2. A drive configuration for a skid steered vehicle, comprising:
   first and second torque outputs that are coupled by a differential and in a torque connection with first and second electric motors, respectively, the differential being configured to mechanically transfer power across itself;
   at least one mechanical power splitter having a first torque transfer feature in a torque connection with a combustion engine, a second torque transfer feature in a torque connection with a respective additional electric motor, and a third torque transfer feature in a torque connection with at least one of the first and second torque outputs of the drive configuration, wherein torque output from the at least one mechanical power splitter in use is dependent on torques generated by the combustion engine and the associated additional electric motor; and
   a controller configured to determine vehicle control information from user input and based on this control performance of the electric motors and the combustion engine to drive rotation of the first and second torque outputs for causing user requested vehicle motion in a manner which enhances an operational parameter of the vehicle.

3. The drive configuration of claim 1, wherein the differential is arranged to transfer torque between the third torque transfer feature of the at least one mechanical power splitter and both the first and second torque outputs of the drive configuration, the differential having: a first sub-arrangement in a torque connection with the first torque output of the drive configuration; a second sub-arrangement in a torque connection with the second torque output of the drive configuration; and a link for receiving torque from the third torque transfer feature of the mechanical power splitter which is common to both said first and second sub-arrangements.

4. The drive configuration of claim 1, wherein the third torque transfer feature of one of the at least one mechanical power splitter is in a torque connection with the first torque output of the drive configuration on one side of the differential, and the third torque transfer feature of another of the at least one mechanical power splitter is in a torque connection with the second torque output of the drive configuration on the other side of the differential.

5. The drive configuration of claim 1, further comprising at least one further electric motor in a torque connection with the differential for imparting a torque differential between torque outputs of the differential.

6. The drive configuration of claim 1, wherein the controller is configured to maintain operation of the combustion engine at a particular rotational speed and control performance of the electric motors in order to cause user requested vehicle motion.

7. The drive configuration of claim 6, wherein the particular rotational speed enhances an operational parameter of the combustion engine.

8. The drive configuration of claim 7, wherein the operational parameter is any of fuel efficiency, engine power output or engine torque output.

9. The drive configuration of claim 1, wherein the controller is configured to detect the occurrence of at least one pre-specified scenario based on at least said user input and, in response, to control performance of each of the electric motors and the combustion engine in a pre-specified manner.

10. The drive configuration of claim 9, wherein information received by the controller from at least one sensor is additionally used to detect the occurrence of said at least one scenario.

11. The drive configuration of claim 1, wherein the at least one mechanical power splitter is a planetary gearset, the first torque transfer feature of which is a sun gear, a ring gear or a carrier gear; the second torque transfer feature of which is another of said sun gear, ring gear and carrier gear; and the third torque transfer feature of which is the remaining of said sun gear, ring gear and carrier gear.

12. The drive configuration of claim 1, further comprising a plurality of gear change units for selectively changing torque output from the first and second torque outputs of the drive configuration in use.

13. The drive configuration of claim 12, wherein the controller is configured to select an appropriate gear ratio based on at least said determined vehicle control information.

14. The drive configuration of claim 1, further comprising at least one additional combustion engine, said engines being arranged in parallel for driving a shaft.

15. A drive configuration for a skid steered vehicle, comprising:
   first and second torque outputs that are coupled by a differential and in a torque connection with first and second electric motors, respectively, the differential being configured to mechanically transfer power across itself;
   at least one mechanical power splitter having a first torque transfer feature in a torque connection with a combustion engine, a second torque transfer feature in a torque connection with a respective additional electric motor, and a third torque transfer feature in a torque connection with at least one of the first and second torque outputs of the drive configuration, wherein torque output from the at least one mechanical power splitter in use is dependent on torques generated by the combustion engine and the associated additional electric motor; and
   a controller configured to determine remaining vehicle battery power from information received from a battery unit, and when this is below a threshold amount to control performance of the combustion engine and the electric motors to cause the battery to charge up while causing user requested vehicle motion in accordance with received user input.

16. A drive configuration for a skid steered vehicle, comprising:
   first and second torque outputs that are coupled by a differential and in a torque connection with first and second electric motors respectively, the differential being configured to mechanically transfer power across itself and includes:
      a pair of outer planetary gear sets and a pair of inner planetary gear sets, both pairs disposed between the first and second electric motors, the pair of inner planetary gear sets being disposed between (i.e., nested within) the pair of outer planetary gear sets, the pair of outer planetary gear sets including:
         a pair of outer planet carriers arranged to turn with the respective output shafts;
         a pair of outer sun gears arranged to turn with the respective rotors of the propulsion motors; and, motors; and,
         a pair of outer ring gears, operatively coupled to each other via a gear arrangement that only allows the outer ring gears to rotate relative to one another in an equal and opposite manner;
      the pair of inner planetary gear sets including:
         a pair of inner planet carriers interconnected by a cross-shaft such that the carriers rotate in common;
         a pair of inner ring gears arranged to turn with the respective output shafts; and
         a pair of inner sun gears, wherein at least one vsun gear is operatively coupled to the gear arrangement and, either the other inner sun gear is also operatively coupled to the gear arrangement so that the inner sun gears rotate relative to one another in an equal and opposite manner, or, the other inner sun gear is fixed stationary.

17. The drive configuration for a skid steered vehicle according to claim 1, wherein the differential that is configured to mechanically transfer power across itself is includes:
   a pair of outer planetary gear sets and a pair of inner planetary gear sets, both pairs disposed between the first and second electric motors, the pair of inner planetary gear sets being disposed between (i.e., nested within) the pair of outer planetary gear sets, the pair of outer planetary gear sets including:
      a pair of outer planet carriers arranged to turn with the respective output shafts;
      a pair of outer sun gears arranged to turn with the respective rotors of the propulsion motors; and, motors; and,
      a pair of outer ring gears, operatively coupled to each other via a gear arrangement that only permits the outer ring gears to rotate relative to one another in an equal and opposite manner;
   the pair of inner planetary gear sets including:
      a pair of inner planet carriers interconnected by a cross-shaft such that the carriers rotate in common;
      a pair of inner ring gears arranged to turn with the respective output shafts; and
   a pair of inner sun gears, wherein at least one vsun gear is operatively coupled to the gear arrangement and, either the other inner sun gear is also operatively coupled to the gear arrangement so that the inner sun gears rotate relative to one another in an equal and opposite manner, or, the other inner sun gear is fixed stationary.

18. A skid steered vehicle comprising a drive configuration according to claim 1.

19. The drive configuration of claim 2, wherein the differential is arranged to transfer torque between the third torque transfer feature of the at least one mechanical power splitter and both the first and second torque outputs of the drive configuration, the differential having: a first sub-arrangement in a torque connection with the first torque output of the drive configuration; a second sub-arrangement in a torque connection with the second torque output of the drive configuration; and a link for receiving torque from the third torque transfer feature of the mechanical power splitter which is common to both said first and second sub-arrangements.

20. The drive configuration of claim 2, wherein the third torque transfer feature of one of the at least one mechanical power splitter is in a torque connection with the first torque output of the drive configuration on one side of the differential, and the third torque transfer feature of another of the at least one mechanical power splitter is in a torque connection with the second torque output of the drive configuration on the other side of the differential.

\* \* \* \* \*